(12) United States Patent
Nießing (10) Patent No.: US 11,674,489 B2
(45) Date of Patent: Jun. 13, 2023

(54) SYSTEM FOR OPERATING A VEHICLE

(71) Applicant: AUDI AG, Ingolstadt (DE)

(72) Inventor: Henning Nießing, Bad Friedrichshall (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/386,650

(22) Filed: Jul. 28, 2021

(65) Prior Publication Data
US 2022/0145841 A1   May 12, 2022

(30) Foreign Application Priority Data

Nov. 11, 2020 (DE) ...................... 10 2020 129 685.1

(51) Int. Cl.
*B60K 6/38* (2007.10)
*F02N 11/04* (2006.01)
(Continued)

(52) U.S. Cl.
CPC ................. *F02N 11/04* (2013.01); *B60K 6/24* (2013.01); *B60K 6/26* (2013.01); *B60K 6/28* (2013.01);
(Continued)

(58) Field of Classification Search
CPC .......... F02N 11/04; F02N 11/00; B60K 6/24; B60K 6/26; B60K 6/28; B60K 6/38;
(Continued)

(56) References Cited

U.S. PATENT DOCUMENTS

| 5,327,987 A * | 7/1994 | Abdelmalek | ......... F01K 23/065 |
| | | | 903/905 |
| 6,569,055 B2 * | 5/2003 | Urasawa | ............... B60W 10/02 |
| | | | 903/905 |

(Continued)

FOREIGN PATENT DOCUMENTS

| CN | 209888641 U | 1/2020 |
| DE | 20 35 240 A | 2/1971 |

(Continued)

OTHER PUBLICATIONS

Examination Report dated Jul. 5, 2021 in corresponding German application No. 10 2020 129 685.1; 10 pages including Machine-generated English-language translation.

*Primary Examiner* — James M Dolak
(74) *Attorney, Agent, or Firm* — Maier & Maier, PLLC (57) ABSTRACT

A system for operating a vehicle, which has an internal combustion engine, an electric machine, a front axle with front wheels, a rear axle with rear wheels and a battery. The system is provided that the electric machine is in a direct force-acting relationship to the rear axle. The system includes at least one primary clutch arrangement, via which the electric machine can be connected to the wheels of at least one axle, and a secondary clutch arrangement via which the electric machine can be connected to the internal combustion engine. For starting the internal combustion engine, the electric machine is to be separated from the wheels of the at least one axle via the at least one primary clutch arrangement and is to be connected to the internal combustion engine via the secondary clutch arrangement.

19 Claims, 3 Drawing Sheets

(51) Int. Cl.
*B60K 6/24* (2007.10)
*B60K 6/26* (2007.10)
*B60K 17/22* (2006.01)
*B60K 6/28* (2007.10)

(52) U.S. Cl.
CPC ............... *B60K 6/38* (2013.01); *B60K 17/22* (2013.01); *B60K 2006/268* (2013.01)

(58) Field of Classification Search
CPC ... B60K 6/22; B60K 6/00; B60K 6/20; B60K 6/40; B60K 6/42; B60K 6/44; B60K 6/442; B60K 2006/268; B60K 17/22; B60K 17/00
See application file for complete search history.

(56) References Cited

U.S. PATENT DOCUMENTS

| | | | | |
|---|---|---|---|---|
| 7,377,344 B2* | 5/2008 | Barske | ................ | B60W 20/10 |
| | | | | 903/918 |
| 7,497,285 B1* | 3/2009 | Radev | ................ | B60K 6/52 |
| | | | | 180/65.23 |
| 8,249,768 B2* | 8/2012 | Mori | ................ | B60W 10/26 |
| | | | | 701/87 |
| 8,532,853 B2* | 9/2013 | Schenk | ................ | B60W 20/40 |
| | | | | 701/22 |
| 8,858,391 B2* | 10/2014 | Tolkacz | ................ | B60K 6/387 |
| | | | | 475/198 |
| 9,499,049 B2* | 11/2016 | Boot | ................ | B60K 17/3462 |
| 9,643,490 B2* | 5/2017 | Gassmann | ................ | B60K 6/54 |
| 9,694,662 B2* | 7/2017 | Nett | ................ | B60K 6/48 |
| 9,707,956 B2* | 7/2017 | Swales | ................ | B60W 10/08 |
| 9,827,842 B2* | 11/2017 | Blasinski | ................ | B60W 10/08 |
| 9,932,031 B2* | 4/2018 | Johri | ................ | B60W 20/13 |
| 10,800,247 B2* | 10/2020 | Paterno | ................ | B60K 6/44 |
| 11,043,169 B2* | 6/2021 | Hyun | ................ | G09G 3/003 |
| 11,345,333 B2* | 5/2022 | Nieβing | ................ | B60L 50/16 |
| 11,578,786 B2* | 2/2023 | Kwon | ................ | F16H 37/042 |
| 11,581,842 B2* | 2/2023 | Seo | ................ | H02P 29/662 |
| 11,584,355 B2* | 2/2023 | Cho | ................ | B60W 20/40 |
| 11,585,413 B2* | 2/2023 | Shim | ................ | B60K 6/365 |

FOREIGN PATENT DOCUMENTS

| | | |
|---|---|---|
| DE | 10 2008 004 366 A1 | 7/2009 |
| DE | 10 2017 109 462 A1 | 11/2017 |
| WO | 2009/021574 A1 | 2/2009 |
| WO | 2014/033137 A1 | 3/2014 |

* cited by examiner

Fig. 1

(Prior art)

SYSTEM FOR OPERATING A VEHICLE

FIELD

The disclosure relates to a system for operating a motor vehicle and a method for operating a motor vehicle.

BACKGROUND

A drive train arrangement for a vehicle and a method for controlling it are known from the document DE 10 2008 004 366 A1.

A system and a method for starting a hybrid vehicle internal combustion engine are described in the document DE 10 2017 109 462 A1.

The document CN 209888641 U describes a hybrid drive for a motor vehicle.

SUMMARY

With this in mind, it was an object to prepare a vehicle for a journey.

The system according to the disclosure is designed to operate a vehicle, wherein the vehicle has an internal combustion engine, an electric machine, a front axle with front wheels, a rear axle with rear wheels and a battery. The system provides that the electric machine is in a direct force-action relationship with the rear axle. The system also has at least one primary clutch arrangement which, in embodiment, has a so-called hang-on module and a so-called torque splitter, via which the electric machine can be temporarily and releasably connected to the wheels of at least one axle. In addition, the system has a secondary clutch arrangement via which the electric machine can be temporarily and releasably connected to the internal combustion engine. To start the internal combustion engine, the electric machine must be separated from the wheels of the at least one axle via the at least one primary clutch arrangement and connected to the internal combustion engine via the secondary clutch arrangement.

When operated as a motor, the electric machine is designed to convert electrical energy from the battery into mechanical energy and to mechanically drive the internal combustion engine.

To charge the battery, the electric machine is to be separated from the wheels of the at least one axle via the at least one primary clutch arrangement and connected to the internal combustion engine via the secondary clutch arrangement, wherein the internal combustion engine is designed to drive the electric machine mechanically, wherein the electric machine, in a regenerative operation, is designed to convert mechanical energy of the internal combustion engine into electrical energy and store it in the battery.

The system has a first primary clutch arrangement via which the electric machine can be connected to the wheels of the rear axle. As an alternative or in addition, the system has a second primary clutch arrangement via which the electric machine can be connected to the wheels of the front axle. With the system, a front axle transmission, a rear axle transmission or an all-wheel drive is possible. In this case, the electric machine can be connected temporarily and releasably to each wheel of usually two wheels on the respective axle individually, i.e. independently of the respective other wheel.

The at least one primary clutch arrangement between the electric machine and the front one and/or the rear axle has two clutches for the respective axle, wherein the electric machine can be temporarily and releasably connected to a respective wheel of the respective axle via a clutch. The at least one primary clutch arrangement is closed while the vehicle is traveling, wherein the electric machine is connected to at least one wheel of the vehicle.

In one embodiment it is provided that the at least one primary clutch arrangement has a torque distributor (torque splitter) and/or is designed as a torque distributor, which is designed to distribute torque between the two wheels of the respective axle.

It is also provided that the electric machine is arranged on and/or at the rear axle. As an alternative or in addition, the electric machine can be arranged either coaxially or axially parallel to at least one drive shaft, that is to say to a drive shaft or to a plurality of drive shafts, of the vehicle. The electric machine can be integrated in a power transmission path in a drive train of the vehicle via a sub or translation stage and a clutch element provided for reasons of efficiency. In embodiments, a power for driving or recuperation is tapped at a ring gear of a rear axle differential.

The system is designed for a vehicle designed as a P3 hybrid vehicle or P3b hybrid vehicle.

The method according to the disclosure is provided for operating a vehicle which has a internal combustion engine, an electric machine, a front axle with front wheels, a rear axle with rear wheels and a battery, with a system, usually with an embodiment of the system presented. The electric machine has a direct force-effect relationship with the rear axle. The system used has at least one primary clutch arrangement, via which the electric machine is connected to the wheels of at least one axle, and a secondary clutch arrangement, via which the electric machine is connected to the internal combustion engine. To start the internal combustion engine, the electric machine is separated from the wheels of the at least one axle via the at least one primary clutch arrangement and connected to the internal combustion engine via the secondary clutch arrangement.

It is also possible for the battery to be charged when the vehicle is at a standstill. For this purpose, the at least one primary clutch arrangement between the electric machine and the at least one wheel is opened and the secondary clutch arrangement between the electric machine and the internal combustion engine is closed. In addition, mechanical energy from the internal combustion engine is converted into electrical energy by the electric machine and stored in the battery. While driving, the second clutch arrangement is opened and the at least one first clutch arrangement is closed, in which case the electric machine converts electrical energy from the battery into mechanical energy for the wheels of the at least one axle.

With the method and the system, it is possible to implement a motor vehicle with a P3 hybrid drive or a P3b hybrid drive without a belt starter generator.

In the case of drives or arrangements of this type, it is usually particularly difficult to get by without an additional starter for the internal combustion engine, since there is usually no clutch between the transmission and the electric machine. Furthermore, with the method and the system it is possible to charge the battery of the vehicle, for example a high-voltage or HV battery, with the electric machine while stationary, for example in a traffic jam, and thus to implement stationary charging.

In one embodiment, it is provided here that the electric machine, usually a shaft of the electric machine, is arranged transversely to the direction of travel of the vehicle and thus along or parallel to the front and rear axles, wherein at least the rear axle also is driven by the electric machine. In addition, the electric machine is connected to a differential of the rear axle, for example fixedly or via a neutral gear. By arranging the electric machine or an electric motor at and/or on the rear axle, in contrast to a P0, P1, P2 or P4 hybrid drive, the drive train can be separated from the wheels immediately in front of the driven shaft and the electric machine can also be used as a generator. This means that when the vehicle is at a standstill, the electric machine can be used as a starter for the internal combustion engine or an internal combustion engine of the vehicle.

To charge the battery, when the electric machine is operated as a generator, mechanical energy from the internal combustion engine is converted into electrical energy by the electric machine and stored in the battery. The mechanical energy flows from the internal combustion engine into the electric machine. When the internal combustion engine is started, the electrical energy flows in the opposite direction from the electric machine into the internal combustion engine. Here, the electric machine drives the internal combustion engine, which starts it. For this purpose, the electric machine converts electrical energy from the battery into the mechanical energy provided for or required by the internal combustion engine. The arrangement provided according to the system makes it possible to start the internal combustion engine with the electric machine arranged on the rear axle, since otherwise the vehicle will start rolling due to a rigid connection of the electric machine with the rear axle or with the rear wheels or a speed synchronization between the speed of the internal combustion engine and the speed of a respective wheel would be required. In addition, the vehicle can be driven via the electric machine or an electric motor and the internal combustion engine in a purely electric, hybrid and/or purely combustion-powered manner as desired. If necessary, the electric machine can also provide a boost power in order to improve the driving performance of the vehicle. Regenerative operation of the electric machine is also possible. Here, kinetic energy of the vehicle can be converted into electrical energy via recuperation, wherein the vehicle is decelerated by the electric machine. Excess energy from the internal combustion engine can also be converted into electrical energy via the electric machine. This can be carried out when driving at constant speed, when accelerating, i.e. when accelerating positively as well as when accelerating or braking negatively, and also when stationary.

The system has the so-called hang-on module and the so-called torque splitter as components. The torque splitter can also be designed or referred to as a torque distributor. In one embodiment, this has two clutches on the rear axle of the vehicle, wherein a rear wheel can be connected to the shaft of the electric machine via a clutch.

If it is provided in the embodiment that the front axle or the front wheels are also driven by the electric machine, a corresponding torque splitter is to be arranged between the electric machine and the front axle or the front wheels. Such a torque splitter is accordingly a clutch system that also enables a drive torque between the front and rear axles and/or to be flexibly distributed between a left and a right wheel of a respective axle. At least one clutch of the torque splitter is designed, for example, as a multi-plate clutch, which is controlled either electro-hydraulically or electro-mechanically, with the necessary transmission of force or the drive torque being provided. It is also possible for the at least one clutch to be designed as a claw clutch or an electrical clutch. With the at least one clutch, a decoupling between the drive train and the wheels is possible.

It is apparent that the above-mentioned features and the features still to be explained hereinafter are usable not only in the particular specified combination but rather also in other combinations or alone, without leaving the scope of the present disclosure.

BRIEF DESCRIPTION OF THE DRAWINGS

The disclosure is illustrated schematically by means of embodiments in the drawing and is described schematically and in detail with reference to the drawing.

The figures will be described coherently and comprehensively.

Like components are assigned the same reference numerals.

DETAILED DESCRIPTION

Figure 1:
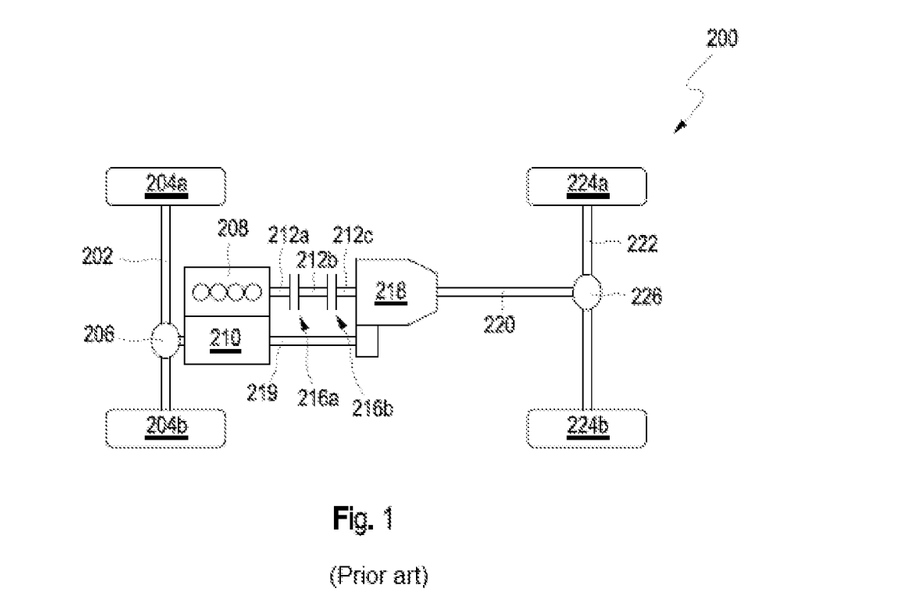
FIG. 1 shows in schematic representation a first example of a vehicle known from the prior art.

The first example of the vehicle 200 shown schematically in FIG. 1 has a front axle 202 on which two front wheels 204a, 204b are arranged. The front axle 202 also includes an axle differential 206. Furthermore, an internal combustion engine 208 and an electric machine 218 are provided to drive the vehicle 200. The vehicle 200 also has a belt starter generator 210 which is connected to the electric machine 218 via a drive shaft 219. In addition, this belt starter generator 210 is arranged here directly next to the internal combustion engine 208. The internal combustion engine 208 and the electric machine 218 are connected to one another via three shaft sections 212a, 212b, 212c, wherein a clutch 216a, 216b is arranged between two immediately adjacent shaft sections 212a, 212b, 212c. Furthermore, the electric machine 218 is connected via a further shaft section 220 to an axle differential 226 of a rear axle 222 of the vehicle 200, on which two wheels 224a, 224b are arranged.

Accordingly, the vehicle 200 here has a hybrid drive train with a P3 architecture, wherein the electric machine 218 for hybridizing the vehicle 200 is arranged here behind a main transmission that has the shaft sections 212a, 212b, 212c between the internal combustion engine 208 and the electric machine 218. To start the internal combustion engine 208 when the vehicle 200 is stationary, it is necessary here to install the belt starter generator 210 or, alternatively, a pinion starter generator, since otherwise it is not possible to start the internal combustion engine 208 while stationary. In this example of the vehicle 200, this is due to the fact that the electric machine 218 is either permanently connected to all wheels 204a, 204b, 224a, 224b or permanently to at least one driven axle 202, 222, which depends on whether that vehicle 200 has front-wheel drive, rear-wheel drive, or all-wheel drive.

Figure 2:
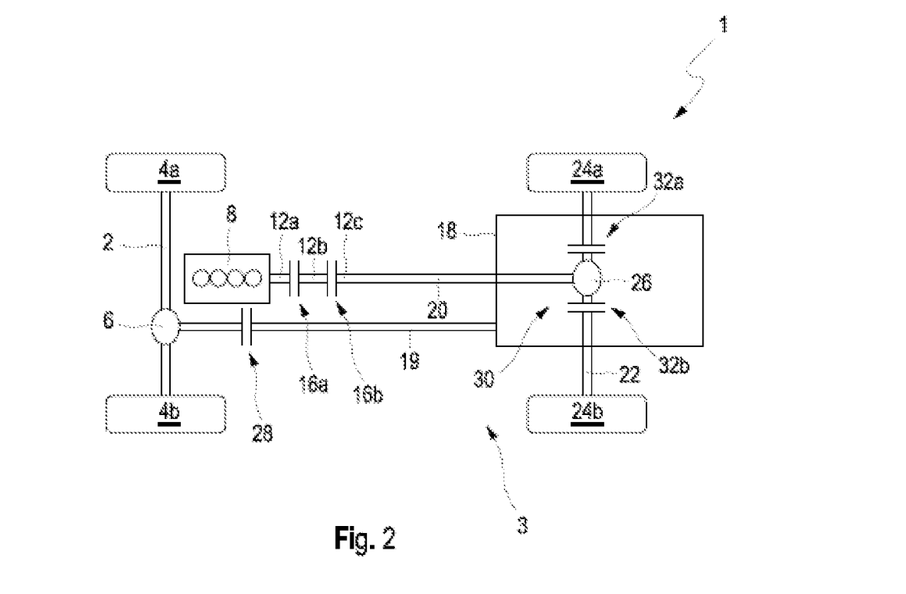
FIG. 2 shows in schematic representation a first embodiment of the system according to the disclosure for carrying out a first embodiment of the method according to the disclosure for a second example of a vehicle.

The second example, shown schematically in FIG. 2, of a vehicle 1 designed here as a motor vehicle has a front axle 2 on which two front wheels 4a, 4b are arranged. Furthermore, the front axle 2 comprises an axle differential 6.

Furthermore, an internal combustion engine 8 and an electric machine 18 are provided to drive the vehicle 1. The vehicle 1 also has a drive shaft 19, via which the axle differential 6 is connected to the electric machine 18. The electric machine 18 is connected to an axle differential 26 of a rear axle 22 of the vehicle 1, on which two wheels 24a, 24b are arranged, via a first primary clutch arrangement, which is designed as a torque distributor 30. Furthermore, a second primary clutch arrangement, which has a clutch 28, is arranged between the electric machine 18 and the axle differential 6. The internal combustion engine 8 and the electric machine 18 are connected to one another via three shaft sections 12a, 12b, 12c, wherein a clutch 16a, 16b is arranged between two immediately adjacent shaft sections 12a, 12b, 12c, which form a secondary clutch arrangement.

In the embodiment of the system 3 according to the disclosure for the second example of the vehicle 1, which is designed here as a motor vehicle, it is provided that a shaft of the electric machine 18 is arranged here transversely to an intended travel direction of the vehicle 1 and thus parallel to the two axes 2, 22. In addition, this electric machine 18 is arranged here on and or at the rear axle 22, depending on the definition.

In addition, the clutch 28 is arranged along a shaft between the electric machine 18 and the axle differential 6 of the front axle 2 and is designed to transmit a drive torque between the electric machine 18 and the axle differential 6 when it is closed, or such a transmission of the drive torque or the force when it is open and thus mechanically separates the electric machine 18 from the axle differential 6.

The first embodiment of the system 3 has the torque distributor 30, which can also be designed or referred to as a torque splitter. This comprises a first clutch 32a and a second clutch 32b, wherein the first clutch 32a is arranged here between the axle differential 26 on the rear axle 22 and the first rear wheel 24a. The second clutch 32b is arranged here between the axle differential 26 of the rear axle 22 and the second rear wheel 24b. With this torque distributor 30, it is possible to temporarily releasably connect or disconnect the electric machine 18 via the shaft 20 to at least one of the two rear wheels 24a, 24b. If a respective clutch 32a, 32b is closed, the electric machine 18 is connected to a respective rear wheel 24a, 24b. If a respective clutch 32a, 32b is open, the electric machine 18 is separated from a respective rear wheel 24a, 24b.

The clutch 28 between the front axle 2 and the electric machine 18 can also be referred to as a hang-on module or as a center differential and, in an embodiment, can be designed, for example, as a multi-plate clutch. The torque distributor 30, which has the two clutches 32a, 32b on the rear axle 22, can in one embodiment replace a conventional rear axle differential. It is possible that the rear axle 22 is subdivided into two shafts or drive shafts, depending on the definition, wherein a clutch 32a, 32b is arranged on or at a respective drive shaft or a respective subsection of the rear axle 22. By integrating the clutch 28 and the torque distributor 30, when the vehicle 1 is in operation, it is possible to separate all wheels 4a, 4b, 24a, 24b from a P3 hybrid drive train, wherein this drive train has at least the shaft sections 12a, 12b, 12c with the clutches 16a, 16b arranged in between, the drive shaft 19 with the clutch 28 and the torque distributor 30 with the two clutches 32a, 32b. The clutches 32a, 32b, the axle differential 26 and the electric machine 18 here form a hybrid rear axle transmission.

When the vehicle 1 is stationary, when all four wheels 4a, 4b, 24a, 24b are disconnected from the drive train and thus from the internal combustion engine 8 and the electric machine 18, it is possible to connect the electric machine 18 to the internal combustion engine 8 via the secondary clutch arrangement and to drive the electric machine 18 with the internal combustion engine 8, wherein mechanical energy of the internal combustion engine 8 is converted into electrical energy by the electric machine 18 when it is operated as a generator and stored in a battery (not shown here) for electrical energy supply or power supply.

It is also possible here to start the internal combustion engine 8 with the electric machine 18 starting from standstill or when the vehicle 1 is at least rolling and thus driving, wherein electrical energy from the battery is converted from the electric machine 18 into mechanical energy for driving the internal combustion engine 8.

By providing the embodiment of the system 3 for performing the first embodiment of the method, it is possible to dispense with otherwise customary components, as are also described with reference to FIG. 1, and to simplify the vehicle 1 accordingly. A belt starter generator 210 is no longer required for the vehicle 1. Furthermore, a belt drive for the internal combustion engine 8 can be dispensed with. Correspondingly, cabling, a control unit and power electronics for the otherwise usual belt starter generator 210 can be dispensed with. A pinion starter that is otherwise common in the prior art can accordingly be omitted. Furthermore, an otherwise necessary DC-DC converter can be omitted. It is also possible that an otherwise required additional voltage level in an on-board network of the vehicle 1 can be dispensed with.

Figure 3:
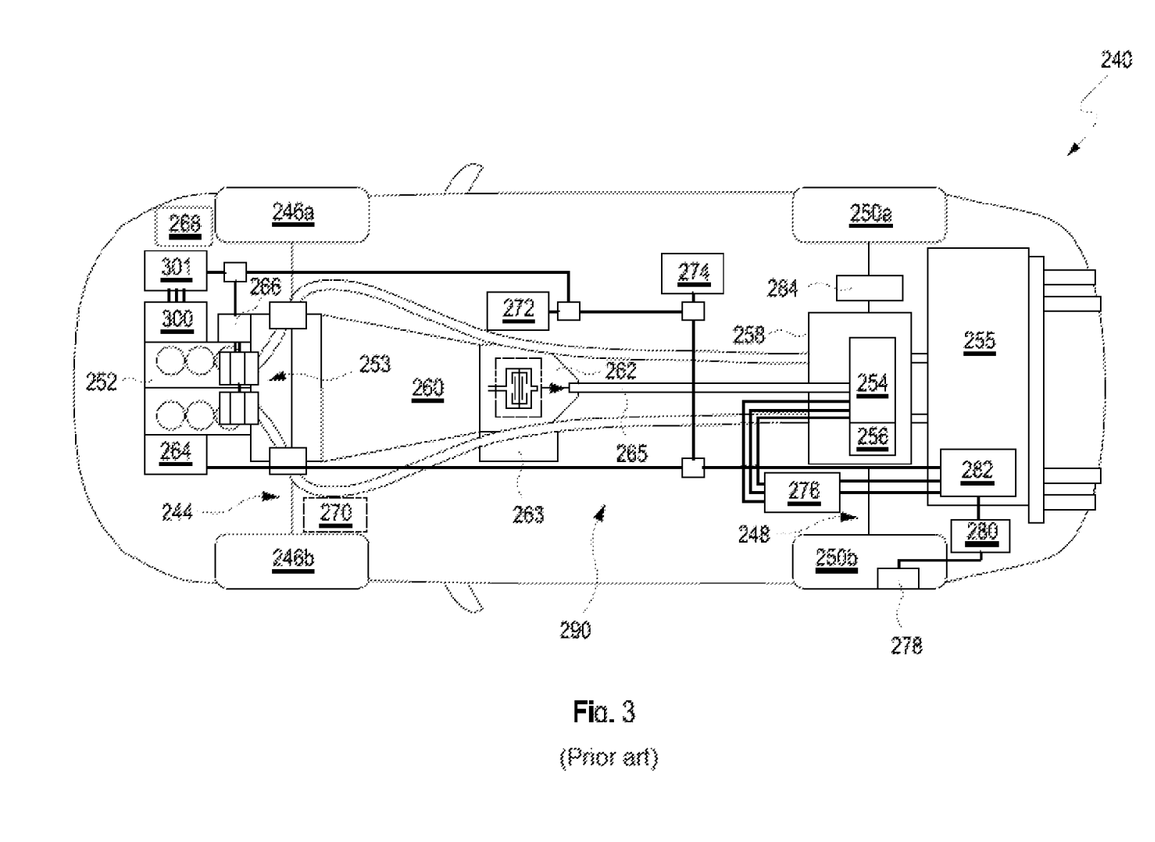
FIG. 3 shows a schematic representation of a third example of a vehicle known from the prior art.

FIG. 3 shows a schematic representation of the third example of the vehicle 240 known from the prior art. This vehicle 240 comprises a front axle 244 on which two front wheels 246a, 246b are arranged, and a rear axle 248 on which two rear wheels 250a, 250b are arranged. In addition, the vehicle 240 has an internal combustion engine 252 or an internal combustion engine to which a catalytic converter device 253 (twice KAT-EKAT-KAT) is assigned. In addition, the vehicle 240 has an electric machine 254, the shaft or axle of which is oriented parallel to the rear axle 248 and thus perpendicular to an intended direction of travel of the vehicle 240. A transmission and a transmission control unit 256 (TCU) are assigned to this electric machine 254. The electric machine 254 and the transmission control unit 256 here form an "H-HAG" or a hybrid rear axle transmission 258. Furthermore, the vehicle 240 has a first battery 255, which is designed here as a high-voltage or HV battery. Furthermore, the vehicle includes a second battery 284 with a low voltage of, for example, 12 volts. The vehicle 240 also has a transmission 260, a clutch arrangement 262 and a further transmission control unit 263, which is also designed to control the clutch arrangement 262. The clutch arrangement 262 and the electric machine 254 are connected to one another here via a shaft 265. With the clutch arrangement 262, it is possible to detachably connect the electric machine 254 to the transmission 260 and thus also to the internal combustion engine 252, wherein the electric machine 254 and the internal combustion engine 252 is connected to one another when the clutch arrangement 262 is closed. It is thus possible to transmit a drive torque or force between the internal combustion engine 252 and the electric machine 254 via the transmission 260, the closed clutch arrangement 262 and the shaft 265. If the clutch arrangement 262 is open, the electric machine 254 is mechanically separated from the transmission 260 and the internal combustion engine 252. The vehicle also has a noise generating device 268 (AVAS) and an iBRS or an integrated brake control system 270. For this vehicle 240, an on-board network 290 is also provided here, which electrically connects further components of the vehicle 240 to one another. These components are an air conditioning compressor 264 (EKK), which is assigned to the internal combustion engine 252, an "EHCC" as a control unit 266 which is assigned to the catalytic converter device 253, an "HV or high voltage PTC" or a high voltage-thermocouple 272, a DC-DC or direct current-direct current converter 274, which is designed to convert an electrical voltage from a high value to 12 volts and vice versa, a pulse inverter 276 (PWR), which is designed for a current of 560 amperes is designed, a charger 280, a BJB (Battery Junction Box) 282, which is assigned to the first battery 255, and a charging socket 278. In addition, FIG. 3 shows a belt starter generator 300 which is required to start the internal combustion engine 252, wherein the belt starter generator 300 is assigned a further pulse inverter 301 for high voltage (HV-RSG PWR).

Figure 4:
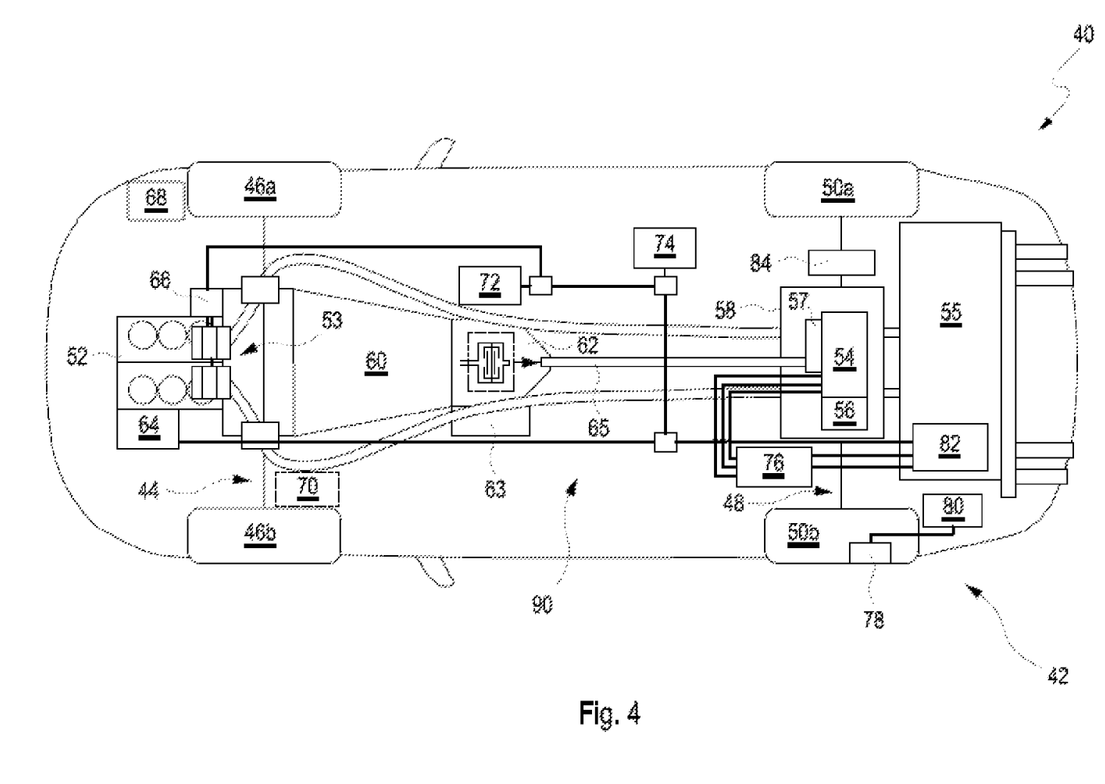
FIG. 4 shows a schematic representation of a second embodiment of the system according to the disclosure for carrying out a second embodiment of the method according to the disclosure for a fourth example of a vehicle.

FIG. 4 shows a schematic representation of the fourth example of the vehicle 40 which comprises the second embodiment of the system 42 according to the disclosure. This vehicle 40 comprises a front axle 44 on which two front wheels 46a, 46b are arranged, and a rear axle 48 on which two rear wheels 50a, 50b are arranged. In addition, the vehicle 40 has an internal combustion engine 52 or an internal combustion engine to which a catalytic converter device 53 (twice KAT-EKAT-KAT) is assigned. In addition, the vehicle 40 has an electric machine 54, the shaft or axle of which is oriented parallel to the rear axle 48 and thus perpendicular to an intended direction of travel of the vehicle. A transmission and a torque distributor 57 (torque splitter) as the primary clutch arrangement and a transmission control unit 56 (TCU) are assigned to this electric machine 54. The electric machine 54, the transmission control unit 56 and the torque distributor 57 form an "H-HAG" or hybrid rear axle transmission 58, which has the transmission control unit 56 two clutches 32a and 32b as components of the electric machine 54. In addition, the hybrid rear axle transmission 58 can have further reduction stages, clutch elements between a differential and the electric machine 54, as well as pumps, coolers and/or include other control units. Furthermore, the vehicle 40 has a first battery 55, which is designed here as a high-voltage or HV battery. Furthermore, the vehicle includes a second battery 84 with a low voltage of, for example, 12 volts. The vehicle 40 also has a transmission 60, a secondary clutch arrangement 62 and a further transmission control unit 63, which is also designed to control the secondary clutch arrangement 62. The secondary clutch arrangement 62 and the electric machine 54 are connected to one another here via a shaft 65. With the secondary clutch arrangement 62, it is possible to detachably connect the electric machine 54 to the transmission 60 and thus also to the internal combustion engine 52, wherein the electric machine 54 and the internal combustion engine 52 is connected to one another when the clutch arrangement 62 is closed. It is thus possible to transmit a drive torque or force between the internal combustion engine 52 and the electric machine 54 via the transmission 60, the secondary closed clutch arrangement 62 and the shaft 65. If the secondary clutch arrangement 62 is open, the electric machine 54 is mechanically separated from the transmission 60 and the internal combustion engine 52.

Furthermore, the vehicle has a noise generating device 68 (AVAS) and an integrated brake control system 70 "iBRS", which makes it possible, when the brake pedal is actuated, to decide independently or automatically whether a friction brake of vehicle 40 should be actuated to decelerate vehicle 40, or a deceleration can be carried out via the electrical recuperation with the electric machine 54. For this vehicle 40, an on-board network 90 is also provided here, which electrically connects further components of the vehicle 40 to one another. These components are an air conditioning compressor 64 (EKK), which is assigned to the internal combustion engine 52, an "EHCC" as a control unit 66 which is assigned to the catalytic converter device 53 and controls how much electrical power is required to heat the catalytic converter device 53, an "HV or high voltage PTC" or a high voltage-thermocouple 72 which uses electrical energy to heat the interior space, a DC-DC or direct current-direct current converter 74, which is designed to convert an electrical voltage from a high value to 12 volts and vice versa, a pulse inverter 76 (PWR), which is designed for a current of 560 amperes is designed, a charger 80, a BJB (Battery Junction Box) 82, which is assigned to the first battery 55, and a charging socket 78.

As a result of this system 42, in comparison to the prior art, it is no longer necessary, in addition to the electric machine 54, which is designed to drive the vehicle 40, to provide an otherwise conventional further electric machine, which is provided to start the internal combustion engine 52 or to charge the battery 55 when the vehicle 40 is stationary. Such an additional electric machine, which is required in the prior art, is designed, for example, as a belt starter generator 300 which, if necessary, can also be combined with a pinion starter. Such an additional electric machine is fed from a 12-volt on-board network or, alternatively, from a high-voltage on-board network, or can feed electrical energy back into a respective on-board network. However, this requires that corresponding cabling and possibly also a second or even third voltage level in the vehicle according to the prior art are required. When the system 42 presented is implemented, power electronics for activating and regulating the additional electric machine, for example the belt starter generator 300, can be dispensed with.

In the method for operating the motor vehicle 40, it is provided that the electric machine 54 is in a direct force-action relationship with the rear axle 48. To start the internal combustion engine 52, the electric machine 54 is separated from the wheels 50a, 50b of the rear axle 48 via the at least one primary clutch arrangement with the torque distributor 57 and connected to the internal combustion engine 52 via the secondary clutch arrangement 62. In motorized operation of the electric machine 54, electrical energy from the battery 55 is converted into mechanical energy and the internal combustion engine 52 is driven mechanically, wherein to charge the battery 55 the electric machine 54 is disconnected from the wheels 50a, 50b of the rear axle 48 via the at least one primary clutch arrangement, here the torque distributor 57, and is connected to the internal combustion engine 52 via the secondary clutch arrangement 62, wherein the electric machine 54 is mechanically driven by the internal combustion engine 52, wherein the electric machine 54 converts mechanical energy of the internal combustion engine 52 into electrical energy in a generator mode and is stored in the battery 55.

REFERENCE SIGNS

1 vehicle
2 front axle
3 system
4a, 4b wheels
5 axle differential
6 combustion engine
12a, 12b, shaft sections 12c
16a, 16b clutch
18 electric machine
19 drive shaft
20 shaft
22 rear axle
24a, 24b wheels
26 axle differential
28 clutch
30 torque distributor
32a, 32b clutch
40 vehicle
42 system
44 front axle
46a, 46b wheels
48 rear axle
50a, 50b wheels
52 combustion engine
53 catalyst device
54 electric machine
55 battery
56 transmission control unit
57 torque distributor
58 hybrid rear axle transmission
60 transmission
62 clutch arrangement
63 transmission control unit
64 air conditioning compressor (EKK)
65 shaft
66 control unit
68 noise generating device (AVAS)
70 integrated brake control system
72 high voltage thermocouple
74 DC-DC converter
76 pulse inverter
78 charging socket
80 charger
82 BJB
84 battery
90 on-board network
200 vehicle
202 front axle
204a, 204b wheels
206 axle differential
208 combustion engine
210 belt starter generator
212a, 212b, shaft section
212c
216a, 216b clutch
218 electric machine
219 drive shaft
220 shaft section
222 rear axle
224a, 224b wheels
226 axle differential
240 vehicle
244 front axle
246a, 246b wheels
248 rear axle
250a, 250b wheels
252 combustion engine
253 catalyst device
254 electric machine
255 battery
256 transmission control unit
258 hybrid rear axle transmission
260 transmission
262 clutch arrangement
263 transmission control unit
264 air conditioning compressor (EKK)
265 shaft
266 control unit
268 noise generating device (AVAS)
270 integrated brake control system
272 high voltage thermocouple
274 DC-DC converter
276 pulse inverter
278 charging socket
280 charger
282 BJB
284 battery
290 on-board network
300 belt starter generator
301 pulse inverter

The invention claimed is:

1. A system for operating a vehicle, comprising:
an internal combustion engine;
an electric machine;
a front axle with front wheels;
a rear axle with rear wheels and a battery, wherein the electric machine is in a direct force-action relationship with the rear axle;
at least one primary clutch arrangement, via which the electric machine is configured to be connected to the wheels of at least one axle, and
a secondary clutch arrangement via which the electric machine is configured to be connected to the internal combustion engine, wherein for starting the internal combustion engine the electric machine is configured to be separated from the at least one primary clutch arrangement and connected to the internal combustion engine via the secondary clutch arrangement, and, when the vehicle is at a standstill, the electric machine is configured to act as a starter for the internal combustion engine.

2. The system according to claim 1, wherein the electric machine is configured to convert electrical energy from the battery into mechanical energy and to drive mechanically the internal combustion engine, wherein for charging the battery the electric machine is further configured to be disconnected from the wheels of the at least one axle via the at least one primary clutch arrangement and connected via the secondary clutch arrangement to the internal combustion engine, wherein the internal combustion engine is configured to drive the electric machine, wherein the electric machine is configured to convert mechanical energy of the internal combustion engine into electrical energy and to store it in the battery.

3. The system according to claim 1, wherein a first primary clutch arrangement via which the electric machine can be connected to the wheels of the rear axle.

4. The system according to claim 1, wherein a second primary clutch arrangement via which the electric machine can be connected to the wheels of the front axle.

5. The system according to claim 1, wherein the at least one primary clutch arrangement has two clutches and the electric machine is configured to be connected via a respective clutch with one respective wheel of a respective axle.

6. The system according to claim 1, wherein the at least one primary clutch arrangement has a torque distributor which is configured to distribute torque between the two wheels of the respective axle.

7. The system according to claim 1, wherein the electric machine is configured to be connected to the rear wheels of the rear axle.

8. The system according claim 1, which is designed for a vehicle designed as a P3 hybrid vehicle.

9. The system according to claim 2, wherein a first primary clutch arrangement via which the electric machine can be connected to the wheels of the rear axle.

10. The system according to claim 2, wherein a second primary clutch arrangement via which the electric machine can be connected to the wheels of the front axle.

11. The system according to claim 3, wherein a second primary clutch arrangement via which the electric machine can be connected to the wheels of the front axle.

12. The system according to claim 2, wherein the at least one primary clutch arrangement has two clutches and the electric machine is configured to be connected via a respective clutch with one respective wheel of a respective axle.

13. The system according to claim 3, wherein the at least one primary clutch arrangement has two clutches, wherein the electric machine can be connected via a respective clutch with one respective wheel of a respective axle.

14. The system according to claim 4, wherein the at least one primary clutch arrangement has two clutches, wherein the electric machine can be connected via a respective clutch with one respective wheel of a respective axle.

15. The system according to claim 2, wherein the at least one primary clutch arrangement has a torque distributor which is configured to distribute torque between the two wheels of the respective axle.

16. The system according to claim 3, wherein the at least one primary clutch arrangement has a torque distributor which is formed to distribute torque between the two wheels of the respective axle.

17. The system according to claim 4, wherein the at least one primary clutch arrangement has a torque distributor which is formed to distribute torque between the two wheels of the respective axle.

18. The system according to claim 5, wherein the at least one primary clutch arrangement has a torque distributor which is configured to distribute torque between the two wheels of the respective axle.

19. The system according to claim 2, wherein the electric machine is configured to be connected to the rear wheels of the rear axle.

* * * * *